United States Patent [19]

Schwindt et al.

[11] 4,387,057

[45] Jun. 7, 1983

[54] NEW DIISOCYANATES CONTAINING SULFUR AND A PROCESS FOR THEIR PREPARATION

[75] Inventors: Jürgen Schwindt; Gerhard Grögler; Otto Ganster, all of Leverkusen; Johannes Koster, Steinau-Naustall, all of Fed. Rep. of Germany

[73] Assignee: Bayer Aktiengesellschaft, Leverkusen, Fed. Rep. of Germany

[21] Appl. No.: 136,624

[22] Filed: Apr. 2, 1980

[30] Foreign Application Priority Data

Apr. 20, 1979 [DE] Fed. Rep. of Germany ....... 2916135

[51] Int. Cl.³ .......................................... C07C 119/048
[52] U.S. Cl. ........................ 260/453 AR; 260/453 PH
[58] Field of Search .................. 260/453 AR, 453 PH

[56] References Cited

U.S. PATENT DOCUMENTS 2,729,666  1/1956  Stallmann .................... 260/453 AR
3,330,848  7/1967  Ulrich ................................ 260/453
3,454,606  7/1969  Brotherton et al. ............. 260/397.7

FOREIGN PATENT DOCUMENTS 2450083  4/1976  Fed. Rep. of Germany .
46-38985  11/1971  Japan .
49-48196  12/1974
1443108  7/1976  United Kingdom .

Primary Examiner—Dolph H. Torrence
Attorney, Agent, or Firm—Gene Harsh; Joseph C. Gil; Richard A. Elder

[57] ABSTRACT

The invention is directed to new sulfur-containing diisocyanates in which a mercapto, sulfoxo or sulfone group joins two aromatic nuclei together or joins an aromatic nucleus to an aliphatic group and in which at least one of the aromatically bound isocyanate groups is in the ortho-position to the sulfur atom. The invention is also directed to a process for the preparation of these new sulfur-containing diisocyanates and to their use in the isocyanate polyaddition process for the production of polyurethanes.

5 Claims, No Drawings

NEW DIISOCYANATES CONTAINING SULFUR AND A PROCESS FOR THEIR PREPARATION

BACKGROUND OF THE INVENTION

The invention is directed to new sulfur-containing diisocyanates in which a mercapto, sulfoxo or sulfone group joins two aromatic nuclei together or joins an aromatic nucleus to an aliphatic group and in which at least one of the aromatically bound isocyanate groups is in the ortho-position to the sulfur atom. The invention is also directed to a process for the preparation of these new sulfur-containing diisocyanates and to their use in the isocyanate polyaddition process for the production of polyurethanes.

Aromatic diisocyanates in which the aromatic nuclei are joined by sulfur and in which the isocyanate groups are in the p,p'- or m,m'- or o,o'-positions to the sulfur atom are known (JA 74-048196; JA 38985/71). But sulfur-containing diisocyanates in which the aromatically bound isocyanate groups are in the o,p'-positions to the sulfur atom and sulfur-containing isocyanates which have an aromatically bound and an aliphatically bound isocyanate group in which the aromatically bound isocyanate group is in the ortho-position to the sulfur atom have not hitherto been disclosed. These compounds are new, interesting components for the synthesis of polyurethanes. They enable preparation of polyurethane elastomers having excellent mechanical properties. Furthermore, due to the greatly differing reactivities of the isocyanate groups thereof, they may be used for reactions with Zerewitinoff active compounds so as to produce predetermined results.

It is particularly surprising to find that it is not only the aromatic-aliphatic diisocyanates of the invention but also those diisocyanates of the invention in which all the isocyanate groups are aromatically bound that have isocyanate groups which differ considerably in reactivity. Moreover, the isocyanate group which is in the ortho-position to sulfur has an approximately ten times higher reactivity with compounds containing active hydrogen atoms than the isocyanate group which is in the para-position. This difference in the reactivity of the two isocyanate groups is found in the unsubstituted diisocyanates of the invention. However, the difference in reactivity may be enhanced by the presence of electron attracting substituents in the para-position to that isocyanate group which is in the ortho-position to the sulfur atom and/or by the presence, in the ortho-position to that isocyanate group which is in the para-position to the sulfur atom, of a substituent which has a sterically hindering effect on the isocyanate group in the para-position to the sulfur atom.

The diisocyanates of the invention are, therefore, particularly valuable starting materials for the production of polyurethanes. They are suitable for the production of polyurethanes by the prepolymer or one-shot process using highly reactive chain-lengthening agents. Starting materials using the diisocyanates of the invention combine the advantage of a sufficiently long pot life due to the relative inertia of the more slowly reacting isocyanate group with the advantage of a desirably short molding time. Compared to molded products produced from known diisocyanates, such as 4,4'-diisocyanato-diphenylmethane or 2,4'-diisocyanato-diphenylmethane, the polyurethane products obtained using the diisocyanates of the invention may be removed more easily from the mold without damage because they resist breaking much more effectively by bending much more quickly.

DESCRIPTION OF THE INVENTION

The present invention relates to diisocyanates corresponding to the general formula:

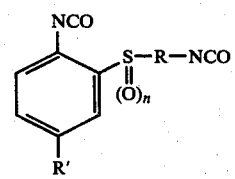

wherein

R represents a saturated aliphatic hydrocarbon group having from 2 to 12 carbon atoms in which at least 2 carbon atoms are situated between the isocyanate group and the sulfur atom, or a paraphenylene group which optionally may have a bromine or chlorine substituent or a substituent selected from the group R", —O—R", —S—R"— or —SO$_2$—R" in at least one of the ortho-positions to the isocyanate group on the paraphenylene group;

R' represents hydrogen, bromine, chlorine, SO$_2$—R", OR" or SR";

R" represents an alkyl group having from 1 to 4 carbon atoms; and n represents 0, 1 or 2.

The invention also relates to a process for the preparation of these diisocyanates, characterized in that diamines corresponding to the general formula:

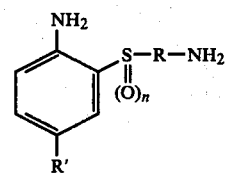

wherein

R represents a saturated aliphatic hydrocarbon group having from 2 to 12 carbon atoms in which at least 2 carbon atoms are situated between the amine group and the sulfur atom, or a paraphenylene group which optionally may have a bromine or chlorine substituent or a substituent selected from the group R", —OR—R", —S—R" or —SO$_2$—R" in at least one of the ortho-positions to the amine group on the paraphenylene group;

R' represents hydrogen, bromine, chlorine, SO$_2$—R", OR" or SR";

R" represents an alkyl group having from 1 to 4 carbon atoms; and n represents 0, 1 or 2;

are subjected to a generally known phosgenation reaction.

Furthermore, the invention relates to the use of the new diisocyanates as components for the synthesis of polyurethanes by the isocyanate polyaddition process.

The new diisocyanates are obtained by the phosgenation of diamines corresponding to the general formula:

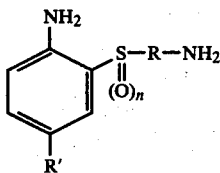

wherein

R, R' and n are as defined immediately above. It is preferred to use those diamines corresponding to the above general formula wherein R represents a saturated aliphatic hydrocarbon group having from 2 to 6 carbon atoms in which at least two carbon atoms are situated between the amine group and the sulfur atom or a p-phenylene group which optionally may have a chlorine or $C_1$–$C_4$ alkyl substituent in at least one ortho-position to the amine group on the p-phenylene group;

R' represents hydrogen; and n represents 0.

The preferred diisocyanates of the invention are, therefore, compounds corresponding to the general formula:

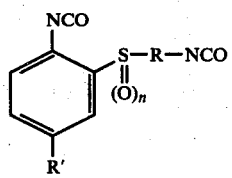

wherein

R represents a saturated aliphatic hydrocarbon group having from 2 to 6 carbon atoms in which at least two carbon atoms are situated between the isocyanate group and the sulfur atom or a p-phenylene group which optionally may have a chlorine or $C_1$–$C_4$ alkyl substituent in at least one ortho-position to the isocyanate group on the p-phenylene group;

R' represents hydrogen; and n represents 0.

The diamines having thioether groups used as starting materials for the process of the invention may be obtained by methods generally known in the art.

Those amines having thioether groups (n=O) used as starting materials in the invention which have an aliphatically bound amino group may be prepared by reacting the corresponding sodium aminothiophenolates having the general formula:

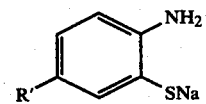

wherein

R' represents hydrogen, bromine, chlorine, $SO_2$—R", OR" or SR" and

R" represents an alkyl group having from 1 to 4 carbon atoms, with the corresponding chloramines having the general formula:

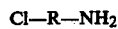

Cl—R—NH$_2$ wherein

R is an aliphatic group; by a process analogous to that described in German Offenlegungsschrift No. 2,734,575. The sodium amino thiophenolates are obtained quite simply by alkaline saponification of the corresponding benzothiazoles.

Those diamines having thioether groups used for the invention in which all the amino groups are aromatically bound may by obtained, for example, by reacting the o-amino substituted sodium thiophenolates mentioned above with the corresponding p-nitrochlorobenzenes having the general formula:

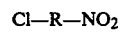

Cl—R—NO$_2$ wherein R is a paraphenylene group, which optionally may have a bromine or chlorine substituent or a substituent from the group —OR", —S—R" or —SO$_2$R", wherein R" represents an alkyl group having from 1 to 4 carbon atoms in the ortho-position to the nitro group, to produce the corresponding intermediate products containing an amino group and a nitro group. Then the nitro group is reduced to the amino group using, for example, zinc/hydrogen chloride or by using Raney nickel as catalyst. The preparation of this intermediate stage has been outlined, for example, in J.Chem.Soc. London, 1930, at page 180.

Another method of preparing thioethers which have two aromatically bound amino groups involves reacting the last-mentioned reduced p-nitrochlorobenzenes with sodium sulfide to produce the corresponding p-amino-thiophenolates having the general formula:

H$_2$N—R—SNa wherein R is a paraphenylene group, and then condensing the p-amino-thiophenolates with o-chloro-nitrobenzenes having the general formula:

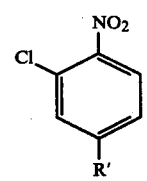

wherein

R' represents hydrogen, bromine, chlorine, $SO_2$—R", OR" or SR", where

R" represents an alkyl group having from 1 to 4 carbon atoms, followed by reduction of the nitro group still present to an amino group. The preparation of an intermediate compound having an amino group and a nitro group has been outlined, for example, in J.Chem.Soc. London, 1930, at page 180.

The diamines containing thioether groups and having two aromatically bound amino groups which may be used in the invention may also be obtained by a reaction of the corresponding o-nitro-thiophenolates with the corresponding p-nitrochlorobenzenes or a reaction of the corresponding p-nitro-thiophenolates with the corresponding o-nitrochlorobenzenes to produce the intermediate compound containing two nitro groups, followed by reduction of the nitro groups. Preparation of the intermediate compound obtained by this method has been described, for example, in the Journal of the American Chemical Society, Volume 45, at page 1399.

Conversion of the diamines containing thioether groups into the corresponding sulfoxides or sulfones is carried out in known manner, either on the intermediate product containing nitro groups (by oxidation with potassium bichromate) or by direct oxidation of the diamines containing thioether groups. Thus, for example, diamines containing thioether groups may easily be converted into the corresponding sulfoxides by oxidation with an equivalent quantity of hydrogen peroxide at about 20° C. When oxidizing the diamines containing thioether groups to the corresponding sulfones, it is advisable to block the amino groups, for example, by acetylation, and then to oxidize with an excess of hydrogen peroxide under reflux. The protective group may subsequently be removed, for example, by saponification with sodium hydroxide solution.

The following are examples of suitable diamines for the process of the invention: 2-(2-aminoethylthio)-aniline; 2-(6-aminohexylthio)-aniline; 2-(12-aminododecylthio)-aniline; 2-(2-aminoethylthio)-5-methoxyaniline; 2-(2-aminoethylthio)-5-chloroaniline; 2-(6-aminohexylthio)-5-ethylsulfono-aniline; 2,4'-diaminodiphenylsulfide; 2,4'-diamino-3'-ethylthio-diphenylsulfide; 2,4'-diamino-3'-ethylsulfono-diphenylsulfide; 2,4'-diamino-5-chlorodiphenylsulfide; 2,4'-diamino-5-chloro-3'-ethyldiphenylsulfide; 2,4'-diamino-5-chloro-3'-ethylthiodiphenylsulfide; 2,4'-diamino-5-ethylsulfono-diphenylsulfide; 2,4'-diamino-5-ethylsulfono-3'-ethylsulfonodiphenylsulfide; 2,4'-diamino-5-methoxydiphenylsulfide; 2,4'-diamino-5-methoxy-3'-i-propyl-diphenylsulfide; 2,4'-diamino-5-methoxy-3'-ethylthiodiphenylsulfide; 2,4'-diamino-diphenylsulfoxide; 2,4'-diamino-3'-ethyl-diphenylsulfoxide; 2,4'-diamino-5-chloro-3'-ethyldiphenylsulfoxide; 2,4'-diamino-5-methoxy-diphenylsulfoxide; 2,4'-diamino-5-ethoxy-3'-ethylmercaptodiphenylsulfoxide; 2-(2-aminoethylsulfoxo)-aniline; 2-(6-aminohexylsulfoxo)-5-chloroaniline; 2-(2-aminoethylsulfoxo)-5-ethoxyaniline; 2,4'-diamino-diphenylsulfone; 2,4'-diamino-3'-i-propyl-diphenylsulfone; 2,4'-diamino-5-chloro-3'-ethyl-diphenylsulfone; 2,4'-diamino-5-chloro-3'-ethyldiphenylsulfone; 2,4'-diamino-5-ethoxy-3'-ethyldiphenylsulfone; 2-(2-aminoethylsulfono)-aniline; 2-(6-aminohexylsulfono)-aniline, 2-(6-aminohexylsulfono)-5-chloroaniline; 2-(2-aminoethylsulfono)-5-methoxyaniline and 2-(6-aminohexylthio)-5-methylthioaniline.

The process of phosgenating the diamines exemplified above to the corresponding diisocyanates is carried out by known methods, preferably using a suitable auxiliary solvent, such as chlorobenzene, at from −20° to +130° C. Suitable phosgenation processes have been described, for example, in High Polymers XVI, "Polyurethanes, Chemistry and Technology", Part I, Interscience Publishers, New York, London, 1962, pages 17 et seq. The structure of the diisocyanates obtained in this phosgenation reaction corresponds, of course, to that of the exemplified diamines used as starting materials. Typical diisocyanates using the process of the invention include, for example, the compounds described in the Examples.

The diisocyanates of the invention may, in principle, also be obtained by other methods not described here, for example by phosgenation of the corresponding N-[o-aminophenyl-mercaptoalkyl (or -phenyl)]-O-(t-butyl)-urethanes (see Example 2c).

The diisocyanates of the invention are valuable starting materials for the production of polyurethanes, in particular polyurethane elastomers and polyurethane foams. The reactants for the thio group-containing diisocyanates may be those generally used for organic diisocyanates in polyurethane chemistry.

The reactants for the diisocyanates preferably have at least two isocyanate-reactive hydrogen atoms, i.e. at least two amino groups, thiol groups, carboxyl groups or, in particular, hydroxyl groups and have molecular weights of from 62 to 10,000, preferably from 1,000 to 6,000. Suitable reactants include simple polyhydric alcohols as well as the known polyhydroxypolyesters, -polyethers, -polythioethers, -polyacetals, -polycarbonates and -polyesteramides generally used for the production of cellular and noncellular polyurethanes. Examples of suitable simple polyhydric alcohols include: ethylene glycol; 1,2-propylene glycol; 1,4-butane diol; 1,6-hexane diol; glycerol; trimethylolpropane; erythritol; pentaerythritol; sorbitol and sucrose. Amines, such as tolylene diamine; phenylene diamine; diaminophenyl disulfite; 2,2'- and 4,4'-alkylene-dithiodianilines; diaminoethane; hexamethylene diamine; 3,3'-dichloro-4,4'-diamino-diphenylmethane and 4,4'-diamino-diphenylmethane are also particularly suitable as chain-lengthening agents.

Suitable polyesters having hydroxyl groups include e.g. reaction products of polyhydric alcohols and polybasic carboxylic acids. The reaction products of dihydric alcohols, optionally with the addition of trihydric alcohols and dibasic carboxylic acids are preferred polyesters. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms and/or may be unsaturated. Suitable polycarboxylic acids and polycarboxylic acid anhydrides include, e.g.: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as oleic acid, optionally mixed with monomeric fatty acids; dimethyl terephthalate and terephthalic acidbis-glycol esters.

Examples of suitable polyhydric alcohols include: ethylene glycol; propylene glycol-(1,2 and -(1,3); butylene glycol-(1,4) and -(2,3); hexane diol-(1,6); octane diol-(1,8); neopentyl glycol; cyclohexane dimethanol (1,4-bis-hydroxyl-methylcyclohexane); 2-methyl-1,3-propane diol; glycerol, trimethylolpropane; hexane triol-(1,2,6); butane triol-(1,2,4); trimethylolethane; pentaerythritol; quinitol; mannitol; sorbitol; methyl glycoside; diethylene glycol; triethylene glycol; tetraethylene glycol; polyethylene glycols; dipropylene glycol; polypropylene glycols; dibutylene glycol and polybutylene glycols.

Suitable polyesters may also contain a proportion of carboxyl end groups. Polyesters of lactones such as ε-caprolactone or polyesters of hydroxycarboxylic acids such as ω-hydroxycaproic acid may also be used.

Suitable polyethers which have at least 2, generally from 2 to 8 and preferably 2 or 3, hydroxyl groups are also known. They are prepared, for example, by polymerization of epoxides, such as ethylene oxide, propylene oxide, butylene oxide, tetrahydrofuran, styrene oxide or epichlorohydrin, either by a self-polymerization process, e.g. in the presence of $BF_3$, or by addition of these epoxides, optionally as mixtures or successively to starting components having reactive hydrogen atoms. Examples of starting components having reactive hydrogen atoms include water, alcohols and amines such as ethylene glycol, propylene glycol-(1,3) or -(1,2), trimethylol propane, 4,4'-dihydroxy-diphenylpropane, aniline, ammonia, ethanolamine or ethylene diamine. Sucrose polyethers may also be used such as those described in German Auslegeschriften Nos. 1,176,358 and 1,064,938. It is often preferred to use polyethers which contain predominantly primary OH groups (i.e. up to 90% by weight primary OH groups based on all the OH groups present in the polyether). Polyethers modified with vinyl polymers such as the compounds obtained by polymerization of styrene or acrylonitrile in the presence of polyethers (U.S. Pat. Nos. 3,383,351; 3,304,273; 3,523,093 and 3,110,695 and German Patent 1,152,536) are also suitable, as are polybutadienes which have OH groups.

Particularly preferred polythioethers are the self-condensation products of thiodiglycol and/or the condensation products of thiodiglycol with other glycols, dicarboxylic acids, formaldehyde, aminocarboxylic acids or amino alcohols. The products obtained are polythiomixed ethers, polythio ether esters or polythio ether ester amides depending on the co-components.

Suitable polyacetals include the compounds which may be prepared from the reaction of glycols, such as diethylene glycol, 4,4'-dioxethoxy-diphenyl dimethylmethane and hexane diol, with formaldehyde. Suitable polyacetals may also be prepared by the polymerization of cyclic acetals.

Suitable polycarbonates having hydroxyl groups are generally known and include, for example, those which may be prepared by the reaction of diol such as propane diol-(1,3); butane diol-(1,4) and/or hexane diol-(1,6); diethylene glycol; triethylene glycol or tetraethylene glycol with diarylcarbonates such as diphenyl carbonate, or by the reaction of diols with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenol/formaldehyde resins or addition products of alkylene oxides and urea/formaldehyde resins may also be used.

Representatives of compounds which may be used in the invention have been described, for example, in High Polymers, Volume XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich 1966, e.g. on pages 45 to 71.

Water and/or readily volatile organic substances are frequently used as blowing agents in the production of polyurethane foams. Examples of suitable organic blowing agents include: acetone; ethyl acetate; methanol; ethanol; and halogen-substituted alkanes such as methylene chloride, chloroform, ethylidene chloride, vinylidene chloride, monofluorotrichloromethane, chlorodifluoromethane and dichlorodifluoromethane; as well as butane; hexane; heptane and diethyl ether. The effect of a blowing agent may also be obtained by the addition of compounds which decompose at temperatures above room temperature to release gases such as nitrogen, e.g. azo compounds, such as azoisobutyric acid nitrile. Further examples of blowing agents and the use of blowing agents have been described in Kunstsoff-Handbuch, Volume VII, published by Vieweg-Hochtlen, Carl-Hanser-Verlag, Munich 1966, e.g. on pages 108 to 109, 453 to 455 and 507 to 510.

Catalysts are also frequently used in the invention. Suitable catalysts include those generally known, such as tertiary amines. Examples of suitable tertiary amines include: triethylamine; tributylamine; N-methylmorpholine; N-ethylmorpholine; N-cocomorpholine; N,N,N',N'-tetramethyl-ethylenediamine; 1,4-diazabicyclo-(2,2,2)-octane; N-methyl-N'-dimethylaminoethyl-piperazine; N,N-dimethyl-benzylamine; bis-(N,N-diethylaminoethyl)-adipate; N,N-diethylbenzylamine; pentamethyl-diethylenetriamine; N,N-dimethylcyclohexylamine; N,N,N',N'-tetramethyl-1,3-butanediamine; N,N-dimethyl-$\beta$-phenylethylamine; 1,2-dimethylimidazole and 2-methylimidazole.

Examples of tertiary amines having isocyanatereactive hydrogen atoms include triethanolamine, triisopropanolamine, N-methyl-diethanolamine, N-ethyl-diethanolamine, N,N-dimethyl-ethanolamine and the reaction products of such tertiary amines with alkylene oxides such as propylene oxide and/or ethylene oxide.

Silaamines having carbon-silicon bonds as described, e.g. in German Pat. No. 1,229,290 may also be used as catalysts. Such catalysts include e.g. 2,2,4-trimethyl-2-silamorpholine or 1,3-diethylaminomethyl-tetramethyl-disiloxane.

Basic nitrogen compounds, such as tetraalkylammonium hydroxides; alkali metal hydroxides such as sodium hydroxide; alkali metal phenolates such as sodium phenolate; and alkali metal alcoholates such as sodium methylate may also be used as catalysts. Hexahydrotriazines are also suitable catalysts.

Organo metallic compounds may also be used as catalysts. Organo tin compounds are particularly preferred. The organo tin compounds used are preferably tin(II) salts of carboxylic acids, such as tin(II) acetate, tin(II) octoate, tin(II) ethyl hexoate and tin(II) laurate, and dialkyl tin salts of carboxylic acids, such as dibutyl tin diacetate, dibutyl tin dilaurate, dibutyl tin maleate or dioctyl tin diacetate.

Further examples of catalysts which may be used and details concerning the activity of the catalysts are given in Kunststoff-Handbuch, Volume VII, published by Vieweg-Hochtlen, Carl-Hanser-Verlag, Munich 1966, e.g. on pages 96 to 102.

The catalysts are generally used in a quantity of from about 0.001 to 10% by weight, based on the quantity of compounds having a molecular weight of from 62 to 10,000 which have at least two isocyanatereactive hydrogen atoms.

Surface active additives such as emulsifiers and foam stabilizers may also be used in the invention. Suitable emulsifiers include e.g. the sodium salts of ricinoleic sulfonates or of fatty acids or salts of fatty acids with amines, such as oleic acid diethylamine or stearic acid diethanolamine. Alkali metal or ammonium salts of sulfonic acids, such as dodecylbenzenesulfonic acid or dinaphthylmethane disulfonic acid, or of fatty acids such as ricinoleic acid, or of polymeric fatty acids may also be used as surface active additives. Preferred foam stabilizers are the water-soluble polyether siloxanes. These compounds generally have a polydimethyl siloxane group attached to a copolymer of ethylene oxide and propylene oxide. Foam stabilizers of this type have been described, for example, in U.S. Pat. No. 2,764,565.

Other additives which may also be used in the invention include: reaction retarders, e.g. substances where are acid in reaction such as hydrochloric acid or organic acid halides and/or organic acid anhydrides; known cell regulators such as paraffins or fatty alcohols or dimethyl polysiloxanes; pigments, dyes; known flame retarding agents such as tris-chloroethyl phosphate or ammonium phosphate and polyphosphate; stabilizers against aging and weathering; plasticizers; fungistatic and bacteriostatic substances and fillers such as barium sulfate, kieselguhr, carbon black or whiting. Other examples of surface active additives, foam stabilizers, cell regulators, reaction retarders, stabilizers, flame retarding substances, plasticizers, dyes, fillers and fungistatic and bacteriostatic substances which may be used and details concerning the use and mode of action of these additives may be found in Kunststoff-Handbuch, Volume VI, published by Vieweg-Hochtlen, Carl-Hanser-Verlag, Munich 1966, e.g. on pages 103 to 113.

The components for the synthesis of polyurethanes can be reacted together by the known one-shot process, prepolymer process or semi-prepolymer process, often using mechanical devices such as those described in U.S. Pat. No. 2,764,565. Details concerning processing apparatus which may also be used for synthesizing polyurethanes may be found in Kunststoff-Handbuch, Volume VI, published by Vieweg-Hochtlen, Carl-Hanser-Verlag, Munich 1966, e.g. on pages 121 to 205.

The reactants used for the production of polyurethanes from the diisocyanates of the invention are generally used in proportions corresponding to an equivalent ratio of isocyanate groups to isocyanatereactive groups of from 0.9:1 to 1.5:1 whether the known one-shot process or prepolymer process is employed. In the prepolymer process, as is well known, the polyisocyanates used as starting material are reacted in a first stage with only part of the other reactants, and this reaction is generally followed by a chain-lengthening reaction of the isocyanate prepolymer formed as intermediate product.

Due to the widely differing reactivities of the isocyanate groups of the diisocyanates of the invention, these diisocyanates are particularly suitable for the production of polyurethanes by the prepolymer process.

The invention is illustrated but should not be limited by the following Examples.

EXAMPLES

EXAMPLE 1

(a) 2-(6-aminohexylthio)-aniline

Approximately 200 ml of methanol are added to 1 mol of o-aminothiophenol-Na solution in 400 ml of water and a solution of 1 mol of 6-chlorohexylamine hydrochloride in approximately 250 ml of water is added dropwise at 70° C. The reaction mixture is refluxed for 4 hours, cooled and made strongly alkaline with sodium hydroxide solution. The organic phase is separated and distilled in a high vacuum.

| Analysis: Element | C | H | N | S |
|---|---|---|---|---|
| Calculated | 64.2 | 8.9 | 12.5 | 14.3 |
| Observed | 64.1 | 9.1 | 12.3 | 14.4 |

(b) 2-(6-isocyanatohexylthio)-phenylisocyanate 89 g (0.4 mol) of 2-(6-aminohexylthio)-aniline dissolved in 0.5 l of 1,2-dichloroethane are added within 5 minutes to a solution of 160 g of phosgene in 1.5 l of 1,2-dichloroethane at $-5°$ C. The reaction mixture is heated to reflux (80° C.) within 2 hours. Phosgene continues to be introduced at this temperature and phosgenation is carried out under reflux for one hour. Excess phosgene is then dispelled with nitrogen for one hour and the solution is concentrated by evaporation and the crude product is distilled. 96 g of 2-(6-isocyanatohexylthio)-phenyl isocyanate (87% of the theoretical yield) are obtained.

| $Bp_{0.4\,mm}$ | | | 170° C. | |
|---|---|---|---|---|
| Isocyanate content (calculated) | | | 30.4% | |
| Isocyanate content (observed) | | | 30.4% | |
| Chlorine content | | | 0.01% | |
| Analysis: Element | C | H | N | O | S |
| Calculated | 60.8 | 5.8 | 10.1 | 11.6 | 11.6 |
| Observed | 60.5 | 5.9 | 10.2 | 11.3 | 12.0 |

(c) 2-(6-isocyanatohexylthio)-phenylisocyanate 148 g (2 mols) of t-butanol are added dropwise within one hour to a mixture of 323 g of 1-chlorohexyl-isocyanate-6, and 0.3 g of tin(II) ethylhexoate at from 70° to 80° C. The mixture is stirred for 2 hours at 80° C. The resulting chlorohexyl-O-(t-butyl)urethane is dissolved in 400 ml of methanol and added dropwise at from 60° to 70° C. to a solution of o-aminothiophenol sodium (2 mols) in 400 ml methanol/400 ml H$_2$O. The reaction mixture is refluxed for 3 hours, cooled and made strongly alkaline with sodium hydroxide solution. The organic phase is separated and dehydrated over Na$_2$SO$_4$. N-[6-(o-aminophenylmercapto)-hexyl]-O-(t-butyl)-urethane is obtained in a yield of from 90 to 95% of the theoretical yield.

200 g of this compound are dissolved in 300 ml of dichlorobenzene and added at room temperature to a solution of 200 g of phosgene in 500 ml of dichlorobenzene. During further addition of phosgene, the reaction temperature is slowly raised to 140° C. Phosgene continues to be introduced while the reaction mixture is refluxed for 2 hours. Excess phosgene is then eliminated by the introduction of nitrogen for 45 minutes while the reaction solution gradually cools. The solution is concentrated by evaporation and the product distilled under vacuum. 145 g of 2-(6-isocyanatohexylthio)-phenyl isocyanate (85% of the theoretical yield) are obtained.

| Isocyanate content (calculated) | 30.4% |
|---|---|
| Isocyanate content (observed) | 30% |
| Chlorine content | 0.02% |

EXAMPLE 2

(a) 2-(2-aminoethylthio)-aniline

Approximately 200 ml of methanol are added to a solution of 1 mol of o-aminothiophenol-Na in 400 ml of water. A solution of 1 mol of chloroethylamine hydrochloride in approximately 200 ml of water is then added at 70° C. The reaction mixture is refluxed for 3 hours, cooled and made strongly alkaline with sodium hydroxide solution. The organic phase is separated off and distilled in a high vacuum.

| Analysis: Element | C | H | N | S |
|---|---|---|---|---|
| Calculated | 57.1 | 7.1 | 16.6 | 19 |
| Observed | 57.0 | 7.0 | 16.4 | 18.8 |

(b) 2-(2-isocyanatoethylthio)-phenylisocyanate 84 g (0.5 mol) of 2-(2-aminoethylthio)-aniline dissolved in 0.5 l of 1,2-dichloroethane are added dropwise within 10 minutes to a solution of 200 g of phosgene in 2 l of 1,2-dichloroethane at −5° C. The subsequent procedure is as described in Example 1 (b). 90 g of 2-(2-isocyanatoethylthio)-phenylisocyanate (82% of the theoretical yield) are obtained.

| $Bp_{0.22\ mm}$ | | | 128° C. | | |
|---|---|---|---|---|---|
| Isocyanate content (calculated) | | | 38.1% | | |
| Isocyanate content (observed) | | | 37.45% | | |
| Chlorine content | | | 0.01% | | |
| Analysis: | | | | | |
| Element | C | H | N | O | S |
| Calculated | 54.5 | 3.6 | 12.7 | 14.5 | 14.5 |
| Observed | 54.6 | 3.5 | 12.7 | 14.4 | 14.6 |

EXAMPLE 3

(a) 2-(2-aminoethylsulfono)-aniline 1 mol of 2-(2-aminoethylthio)-aniline and 2 mols of triethylamine are dissolved in 2.5 l of toluene, and 2 mols of acetyl chloride are added dropwise with cooling. The reaction mixture is then stirred for 2 hours at 60° C., left to cool and suction filtered.

1 mol of 2-(2-acetamidoethylthio)-acetanilide are introduced into a reaction vessel with 800 ml of water and the mixture is heated to 80° C. 2.5 mols of a 35% H$_2$O$_2$ solution are added; an exothermic reaction results so that the reaction mixture boils under reflux. It is then stirred at 100° C. and cooled, and 2.5 mol of NaOH are carefully added. Boiling is then continued for a further hour at 100° C. to split off the acetyl groups. The organic phase is separated and dehydrated over Na$_2$SO$_4$.

| Analysis: Element | C | H | N | O | S |
|---|---|---|---|---|---|
| Calculated | 48 | 6 | 14 | 16 | 16 |
| Observed | 47.8 | 6.2 | 13.7 | 16.1 | 16.2 |

(b) 2-(2-isocyanatoethylsulfono)-phenylisocyanate 200 g (1 mol) of 2-(2-aminoethylsulfono)aniline dissolved in 1 l of chloroform are added dropwise within 10 minutes to a solution of 200 g of phosgene in 1.5 l of chlorobenzene at −5° C. The subsequent procedure is as described in Example 1. 218 g of 2-(2-isocyanatoethylsulfono)-phenylisocyanate (86.5% of the theoretical yield) are obtained.

| Isocyanate content (calculated) | | | 33.3% | | |
|---|---|---|---|---|---|
| Isocyanate content (observed) | | | 32.4% | | |
| Chlorine content | | | 0.07% | | |
| Analysis: | | | | | |
| Element | C | H | N | O | S |
| Calculated | 47.6 | 3.2 | 11.1 | 25.4 | 12.7 |
| Observed | 47.7 | 3.3 | 10.9 | 25.2 | 12.9 |

EXAMPLE 4

(a) 2-(2-aminoethylsulfoxo)-aniline 1 mol of 2-(2-aminoethylthio)-aniline is converted into the bis-acetamide as described in Example 3(a). The bis-acetamide is introduced into a reaction vessel with 700 ml of water and 1.1 mol of a 35% H$_2$O$_2$ solution are added dropwise at 10° C. The reaction mixture is subsequently stirred for 5 hours at 20° C. and 2.5 mol of NaOH are carefully added to destroy excess H$_2$O$_2$ solution. The reaction mixture is boiled at 100° C. for 1.5 hours to split off the acetyl groups and the organic phase is separated while hot and dehydrated over Na$_2$SO$_4$.

| Analysis: Element | C | H | N | O | S |
|---|---|---|---|---|---|
| Calculated | 52.2 | 6.5 | 15.2 | 8.7 | 17.4 |
| Observed | 52.4 | 6.4 | 14.9 | 8.8 | 17.5 |

(b) 2-(2-isocyanatoethylsulfoxo)-phenylisocyanate 184 g (1 mol) of 2-(2-aminoethylsulfoxo)-aniline dissolved in 1 l of chlorobenzene are added dropwise within 10 minutes to a solution of 200 g of phosgene in 1.5 l of chlorobenzene at −5° C. The subsequent procedure is as described in Example 1. 205 g of 2-(2-isocyanatoethylsulfoxo)-phenylisocyanate (80% of the theoretical yield) are obtained.

| Isocyanate content (calculated) | | | 35.6% | | |
|---|---|---|---|---|---|
| Isocyanate content (observed) | | | 35.5% | | |
| Chlorine content | | | 0.01% | | |
| Analysis: | | | | | |
| Element | C | H | N | O | S |
| Calculated | 50.8 | 3.4 | 11.9 | 20.3 | 13.5 |
| Observed | 51 | 3.4 | 11.7 | 20.1 | 13.7 |

EXAMPLE 5

(a) 2-(6-aminohexylsulfono)-aniline 1 mol of 2-(6-aminohexylthio)-aniline is converted into the bis-acetamide as described in Example 3(a). The bis-acetamide is introduced into a reaction vessel with 800 ml of water, and 2.5 moles of a 35% H$_2$O$_2$ solution are added dropwise at 80° C. The reaction mixture is then stirred at 100° C. and cooled, and 2.5 mols of NaOH are added. Boiling is then continued for one hour at 100° C. to split off the acetyl groups. The organic phase is separated while hot and dehydrated over Na$_2$SO$_4$.

| Analysis: | | | | | |
|---|---|---|---|---|---|
| Element | C | H | N | O | S |
| Calculated | 56.2 | 7.8 | 10.9 | 12.5 | 12.5 |
| Observed | 56.2 | 7.6 | 11 | 12.5 | 12.6 |

(b) 2-(6-isocyanatohexylsulfono)-phenylisocyanate 128 g (0.5 mol) of 2-(6-aminohexylsulfono)-aniline dissolved in 1.0 l of chlorobenzene are added dropwise within 10 minutes to a solution of 200 g of phosgene in 2 l of chlorobenzene at −10° C. The subsequent procedure is as described in Example 1. 123 g of 2-(6-isocyanaotohexylsulfono)-phenylisocyanate (80% of the theoretical yield) are obtained.

| Isocyanate content (calculated) | | | 27.3% | |
|---|---|---|---|---|
| Isocyanate content (observed) | | | 26.9% | |
| Chlorine content | | | 0.03% | |
| Analysis: | | | | |
| Element | C | H | N | O | S |
| Calculated | 54.5 | 5.2 | 9.1 | 20.8 | 10.4 |
| Observed | 54.3 | 5.5 | 9 | 20.7 | 10.5 |

EXAMPLE 6

(a) 2,4'-diamino-diphenylsulfide 200 ml of methanol are added to 1 mol of o-aminothiophenol-Na solution in 400 ml of water, and a warm solution of 4-nitrochlorobenzene in 300 ml of methanol is added dropwise at 80° C. The reaction mixture is then stirred under reflux for 4 hours and cooled, suction filtered, washed with water and dried. 1 mol of the nitroamino compound is dissolved in methanol and then hydrogenated to the diamine in known manner, using Raney-Ni.

| Analysis: | | | | |
|---|---|---|---|---|
| Element | C | H | N | S |
| Calculated | 66.7 | 5.5 | 13 | 14.8 |
| Observed | 66.5 | 5.7 | 12.8 | 15 |

(b) 2,4'-diisocyanatodiphenylsulfide 324 g (1.51 mols) of 2,4'-diaminodiphenylsulfide dissolved in 1.8 l of chlorobenzene are added dropwise within 35 minutes to a solution of 600 g of phosgene in 1.8 l of chlorobenzene at from −10° to 0° C. The reaction mixture is then heated to reflux (130° C.) during a period of 1.5 hours. Starting at 80° C., additional phosgene is introduced into the solution. As the introduction of phosgene is continued, the reaction mixture is heated at the reflux temperature for 2 hours. Finally, phosgene is eliminated by the introduction of nitrogen for 45 minutes while the reaction solution gradually cools, and the solution is concentrated by evaporation and the product distilled under vacuum. 361 g (1.35 mols) of 2,4'-diisocyanatodiphenylsulfide (89.8% of the theoretical yield) are obtained.

| Isocyanate content (calculated) | | | 31.34% | |
|---|---|---|---|---|
| Isocyanate content (observed) | | | 31.3% | |
| Chlorine content | | | 0.05% | |
| Analysis: | | | | |
| Element | C | H | N | O | S |
| Calculated | 62.7 | 3 | 10.4 | 11.9 | 11.9 |
| Observed | 62.8 | 2.9 | 10.3 | 12.1 | 11.8 |

EXAMPLE 7

(a) 2,4'-diaminodiphenylsulfone 1 mol of the diamine described in Example 6(a) is reacted with acetyl chloride as described in Example 3 and oxidized with 2.5 mol of an H₂O₂ solution. 300 ml of glacial acetic acid are used as solvent. After elimination of the acetyl groups with NaOH, the organic phase is separated from the aqueous solution, taken up with methylene chloride and dehydrated over Na₂SO₄. Methylene chloride is then removed under vacuum.

| Analysis: | | | | | |
|---|---|---|---|---|---|
| Element | C | H | N | O | S |
| Calculated | 58 | 4.8 | 11.3 | 12.9 | 12.9 |
| Observed | 57.9 | 4.8 | 11.2 | 13.1 | 12.9 |

(b) 2,4'-diisocyanatodiphenylsulfone 248 g (1 mol) of 2,4'-diaminodiphenylsulfone dissolved in 1.5 l of chlorobenzene are introduced dropwise within 35 minutes into a solution of 450 g of phosgene in 2.2 l of chlorobenzene at from −10° to 0° C. The subsequent procedure is as described in Example 1. 285 g of 2,4'-diisocyanatodiphenylsulfone (95% of the theoretical yield) are obtained.

| Isocyanate content (calculated) | | | 28% | |
|---|---|---|---|---|
| Isocyanate content (observed) | | | 27.6% | |
| Chlorine content | | | 0.015% | |
| Analysis: | | | | |
| Element | C | H | N | O | S |
| Calculated | 56 | 2.7 | 9.3 | 21.3 | 10.7 |
| Observed | 56 | 2.8 | 9.1 | 21.4 | 10.7 |

EXAMPLE 8

(a) 2,4'-diaminodiphenylsulfoxide 1 mol of the diamine described in Example 6(a) is reacted with acetyl chloride as described in Example 3 and oxidized with 1 mol of an H₂O₂ solution. 300 ml of glacial acetic acid are used as solvent. 2,4'-diaminodiphenylsulfoxide is obtained after elimination of the acetyl groups with NaOH.

| Analysis: | | | | | |
|---|---|---|---|---|---|
| Element | C | H | N | O | S |
| Calculated | 62 | 5.2 | 12.1 | 6.9 | 13.8 |
| Observed | 62.2 | 5 | 12 | 7 | 13.8 |

(b) 2,4'-diisocyanatodiphenylsulfoxide 332 g (1.5 mols) of 2,4'-diaminodiphenylsulfoxide dissolved in 2 l of chlorobenzene are added dropwise within 20 minutes to a solution of 300 g of phosgene in 1 l of chlorobenzene at from −10° to 0° C. The subsequent procedure is as described in Example 1. 410 g of 2,4'-diisocyanatodiphenylsulfoxide (96.5% of the theoretical yield) are obtained.

| Isocyanate content (calculated) | 29.6% |
|---|---|

-continued

| Isocyanate content (observed) | | | 29.1% | |
|---|---|---|---|---|
| Chlorine content | | | 0.035% | |
| Analysis: | | | | |
| Element | C | H | N | O | S |
| Calculated | 59.1 | 2.8 | 9.8 | 16.9 | 11.3 |
| Observed | 59.2 | 2.7 | 9.9 | 16.8 | 11.3 |

EXAMPLE 9

(a) 2,4'-diamino-3'-chlorodiphenylsulfide

A warm solution of 1 mol of 2,4-dichloronitrobenzene in 350 ml of methanol is added dropwise to a solution of 1 mol of o-aminothiophenol-Na in 400 ml of water and 200 ml of methanol at 80° C. The reaction mixture is then stirred under reflux for 4 hours, cooled and diluted with 1 l of ice water, suction filtered, washed with water and dried. 1 mol of the mono-nitro compound is dissolved in methanol and hydrogenated to the diamine with Raney-Ni in known manner.

| Analysis: | | | | | |
|---|---|---|---|---|---|
| Element | C | H | N | S | Cl |
| Calculated | 57.5 | 4.4 | 11.2 | 12.8 | 14.2 |
| Observed | 57.3 | 4.4 | 11.1 | 12.7 | 14.9 |

(b) 2,4'-diisocyanato-3'-chlorodiphenylsulfide 158 g (0.632 mol) of 2,4'-diamino-3'-chlorodiphenylsulfide dissolved in 0.8 l of chlorobenzene are added dropwise within 20 minutes to a solution of 300 g of phosgene in 0.8 l of chlorobenzene at from −10° to 0° C. The subsequent procedure is as described in Example 1 and 188 g of 2,4'-diisocyanato-3'-chlorodiphenylsulfide (97.9% of the theoretical yield) are obtained.

| Isocyanate content (calculated) | 27.76% |
|---|---|
| Isocyanate content (observed) | 26.94% |
| Chlorine content | 0.04% |

EXAMPLE 10

(a) 2,4'-diamino-3'-chlorodiphenylsulfone 1 mol of the diamine described in Example 3 is converted into the bis-acetamide by reaction with acetyl chloride as described in Example 3. 1 mol of the bis-acetamide is dissolved in 300 ml of glacial acetic acid and oxidized with 2.5 mols of a 30% solution of $H_2O_2$. After elimination of the acetyl group with NaOH, the organic phase is separated, taken up with methylene chloride and dehydrated over $Na_2SO_4$. Methylene chloride is then removed under vacuum.

| Analysis: | | | | | | |
|---|---|---|---|---|---|---|
| Element | C | H | N | O | S | Cl |
| Calculated | 51 | 3.9 | 9.9 | 11.3 | 11.3 | 12.5 |
| Observed | 50.9 | 4.0 | 9.7 | 11.3 | 11.5 | 12.6 |

(b) 2,4'-diisocyanato-3'-chlorodiphenylsulfone 282.5 g (1 mol) of 2,4'-diamino-3'-chlorodiphenylsulfone dissolved in 2 l of chlorobenzene are added dropwise within 25 minutes to a solution of 300 g of phosgene in 1.2 l of chlorobenzene at from −10° to 0° C. The subsequent procedure is as described in Example 1. 300 g of 2,4'-diisocyanato-3'-chlorodiphenylsulfone (90.0% of the theoretical yield) are obtained.

| Isocyanate content (calculated) | | | 25.1% | | |
|---|---|---|---|---|---|
| Isocyanate content (observed) | | | 24.7% | | |
| Chlorine content | | | 0.05% | | |
| Analysis: | | | | | |
| Element | C | H | N | O | S | Cl |
| Calculated | 50.2 | 2.1 | 8.4 | 19.1 | 9.6 | 10.6 |
| Observed | 50.1 | 2.1 | 8.2 | 19.0 | 9.8 | 10.8 |

EXAMPLE 11

(a) 2,4'-diamino-3'-ethyldiphenylsulfide

A warm solution of 2-chloronitrobenzene in 300 ml of methanol is added dropwise at 80° C. to a solution of 1 mol of p-aminothiophenol-Na in 200 ml of methanol and 400 ml of water. The reaction mixture is then stirred under reflux for 3 hours, cooled, diluted with 1 l of ice water, suction filtered, washed with water and dried. 0.5 mol of 2-nitro-4'-aminodiphenylsulfide, 1 g of aluminum filings and 0.01 g of $HgCl_2$ are heated in a high pressure autoclave and ethylene is forced in under pressure. The reaction is completed after from 2 to 3 hours. Sodium hydroxide solution is added to the reaction mixture, and the organic phase is separated, dissolved in methanol and hydrogenated to the diamine with Raney nickel in known manner.

| Analysis: | | | | |
|---|---|---|---|---|
| Element | C | H | N | S |
| Calculated | 68.8 | 6.5 | 11.5 | 13.1 |
| Observed | 68.9 | 6.5 | 11.3 | 13.2 |

(b) 2,4'-diisocyanato-3'-ethyldiphenylsulfide 245 g (1 mol) of a 2,4'-diamino-3'-ethyldiphenylsulfide dissolved in 0.8 l of chlorobenzene are added dropwise within 25 minutes to a solution of 300 g of phosgene in 1 l of chlorobenzene at from −10° to 0° C. The subsequent procedure is as described in Example 1. 271 g of 2,4'-diisocyanato-3'-ethyldiphenylsulfide (91.2% of the theoretical yield) are obtained.

| Isocyanate content (calculated) | | | 28.2% | |
|---|---|---|---|---|
| Isocyanate content (observed) | | | 27.8% | |
| Chlorine content | | | 0.03% | |
| Analysis: | | | | |
| Element | C | H | N | O | S |
| Calculated | 64.9 | 4.1 | 9.4 | 10.8 | 10.8 |
| Observed | 64.8 | 4.2 | 9.3 | 10.7 | 10.9 |

EXAMPLE 12

(a) 2,4'-diamino-3'-ethylmercaptodiphenylsulfide

A warm solution of 1 mol of 4-chloro-3-ethylmercapto-1-nitrobenzene in 400 ml of methanol are added dropwise at 80° C. to a solution of 1 mol of p-amino-thiophenol-Na in 200 ml of methanol and 400 ml of water. The reaction mixture is then stirred under reflux for 4 hours, cooled, diluted with 1.5 l of ice water, suction filtered, washed with water and dried. 1 mol of the nitroamino compound is dissolved in methanol and hydrogenated to the diamine with Raney nickel in known manner.

| Analysis: Element | C | H | N | S |
|---|---|---|---|---|
| Calculated | 60.8 | 5.8 | 10.1 | 23.2 |
| Observed | 60.8 | 5.7 | 10.2 | 23.3 |

(b) 2,4'-diisocyanato-3'-ethylmercaptodiphenylsulfide 415 g (1.5 mols) of 2,4'-diamino-3'-ethylmercaptodiphenylsulfide dissolved in 1.8 l of chlorobenzene are added dropwise within 40 minutes to a solution of 600 g of phosgene in 1.9 l of chlorobenzene at from −10° to 0° C. The subsequent procedure is as described in Example 1. 431 g of 2,4'-diisocyanato-3'-ethylmercaptodiphenylsulfide (87.2% of the theoretical yield) are obtained.

| Isocyanate content (calculated) | | | 25.5% | |
|---|---|---|---|---|
| Isocyanate content (observed) | | | 25.1% | |
| Chlorine content | | | 0.04% | |
| Analysis: Element | C | H | N | O | S |
| Calculated | 58.5 | 3.7 | 8.5 | 9.7 | 19.5 |
| Observed | 58.6 | 3.7 | 8.3 | 9.8 | 19.6 |

EXAMPLE 13

(a) 2,4'-diamino-5-methoxydiphenylsulfide

A warm solution of 3-chloro-4-nitro-1-methoxybenzene in 400 ml of methanol is added dropwise at 80° C. to a solution of 1 mol of p-aminothiophenol-Na in 200 ml of methanol and 400 ml of water. The reaction mixture is then stirred under reflux for 3 hours, cooled, diluted with 1 l of ice water, suction filtered, washed with water and dried. 1 mol of the nitroamino compound is dissolved in methanol and hydrogenated to the diamine with Raney nickel in known manner.

| Analysis: Element | C | H | N | O | S |
|---|---|---|---|---|---|
| Calculated | 63.4 | 5.7 | 11.4 | 6.5 | 13 |
| Observed | 63.2 | 5.7 | 11.3 | 6.7 | 13.1 |

(b) 2,4'-diisocyanato-5-methoxydiphenylsulfide 246 g (1 mol) of 2,4'-diamino-5-methoxydiphenylsulfide dissolved in 1.3 l of chlorobenzene are added dropwise within 30 minutes to a solution of 400 g of phosgene in 1 l of chlorobenzene at from −5° to 0° C. The subsequent procedure is as described in Example 1. 256 g of 2,4'-diisocyanato-5-methoxydiphenylsulfide (86% of the theoretical yield) are obtained.

| Isocyanate content (calculated) | | | 28.2% | |
|---|---|---|---|---|
| Isocyanate content (observed) | | | 27.9% | |
| Chlorine content | | | 0.04% | |
| Analysis: Element | C | H | N | O | S |
| Calculated | 60.4 | 3.3 | 9.1 | 16.1 | 10.7 |
| Observed | 60.5 | 3.3 | 9.2 | 16.1 | 10.9 |

EXAMPLES OF PRACTICAL APPLICATION

EXAMPLE 14

(Comparison Example)

100 parts by weight of a prepolymer having an isocyanate content of 3.7% prepared from a polyether mixture consisting of 45 parts by weight of polypropylene glycol of molecular weight 2000, 45 parts by weight of polypropylene glycol of molecular weight 1000 and 5 parts by weight of propoxylated trimethylolpropane of molecular weight 4800 and 20.5 parts by weight of 2,4-tolylene diisocyanate are mixed with 11.3 parts by weight of 3,5-diamino-4-methylbenzoic acid-2-ethylhexyl ester at 60° C. (NCO:NH$_2$=1.1). The mixture remains in a pourable state for 45 seconds at 60° C. It is poured into a mold which has been preheated to 110° C., and it may be removed from the mold after 3.5 minutes at this temperature. The resistance to breakage by bending is obtained after 7 minutes at this temperature. After a tempering time of 24 hours at 110° C., an elastomer having the following mechanical properties is obtained:

| Tensile strength (DIN 53504) | 21.7 MPa |
|---|---|
| Elongation at break (DIN 53504) | 724% |
| Tear propagation resistance (DIN 53515) | 36.5 KN/m |
| Shore Hardness A (DIN 53505) | 87 |
| Elasticity (DIN 53512) | 55% |

EXAMPLE 15

(Comparison Example)

100 parts by weight of the prepolymer having an isocyanate content of 3.6% NCO prepared from the polypropylene glycol-polyether mixture of Example 14 and 29.47 parts by weight of 4,4-diisocyanatodiphenylmethane are mixed with 10.83 parts by weight of 3,5-diamino-4-methylbenzoic acid-2-ethylhexylester (NCO:NH$_2$=1.1) at 60° C. The mixture remains in a pourable state for one minute at 60° C. It is poured into a mold which has been preheated to 110° C. and may be removed from the mold after 45 seconds at this temperature. The resistance to breakage by bending is reached after 7.5 minutes at this temperature. An elastomer having the following mechanical properties is obtained after a tempering time of 24 hours at 110° C.:

| Tensile strength (DIN 53504) | 21.1 MPa |
|---|---|
| Elongation at break (DIN 53504) | 812% |
| Tear propagation resistance (DIN 53515) | 36.6 KN/m |
| Shore Hardness A (DIN 53505) | 84 |
| Elasticity (DIN 53512) | 38% |

EXAMPLE 16

(According to the Invention)

100 parts by weight of a prepolymer having an isocyanate content of 3.55% prepared from the polypropylene glycol-polyether mixture of Example 14 and 31.63 parts by weight of a sulfur-containing diisocyanate of the invention (2,4'-diisocyanatodiphenylsulfide) are mixed with 10.82 parts by weight of 3,5-diamino-4-methylbenzoic acid-2-ethylhexylester (NCO:NH$_2$=1.1) at 60° C. The mixture remains in a pourable state for 1.5 minutes at 70° C. It is poured into a mold which has been preheated to 110° C. and may be removed from the mold after one minute at this temperature. The resistance to breakage by bending is reached after 2 minutes. An elastomer having the following mechanical properties is obtained after a tempering time of 24 hours at 110° C.:

| Tensile strength (DIN 53504) | 18.9 MPa |
|---|---|
| Elongation at break (DIN 53504) | 816% |
| Tear propagation resistance (DIN 53515) | 38.9 KN/m |
| Shore Hardness A (DIN 53505) | 75 |
| Elasticity (DIN 53512) | 47% |

EXAMPLE 17

(Comparison Example)

100 parts by weight of a prepolymer having an isocyanate content of 4.4% NCO prepared from the polypropylene glycol-polyether mixture of Example 14 and 25.95 parts by weight of 2,4-tolylene diisocyanate are mixed with 13.86 parts by weight of 3,5-diamino-4-methylbenzoic acid-2-ethylhexylester (NCO:NH$_2$=1.05) at 60° C. The mixture remains in a pourable state for 40 seconds at 60° C. It is poured into a mold which has been preheated to 80° C. and may be removed from the mold after 4 minutes at this temperature. The resistance to breakage by bending is reached after 7 minutes at this temperature. An elastomer having the following mechanical properties is obtained after 24 hours tempering at 80° C.:

| Tensile strength (DIN 53504) | 24.9 MPa |
|---|---|
| Elongation at break (DIN 53504) | 602% |
| Tear propagation resistance (DIN 53515) | 39.6 KN/m |
| Shore Hardness A (DIN 53505) | 90 |
| Elasticity (DIN 53512) | 44 |

EXAMPLE 18

100 parts by weight of a prepolymer having an isocyanate content of 4.38% NCO obtained from the polypropylene glycol-polyether mixture of Example 15 and 39.75 parts by weight of a sulfur-containing diisocyanate of the present invention (2,4'-diisocyanatodiphenylsulfide) are mixed with 13.84 parts by weight of 3,5-diamino-4-methylbenzoic acid-2-ethylhexylester (NCO:NH$_2$=1.05) at 60° C. The mixture remains in a pourable state for one minute at 60° C. It is poured into a mold which has been preheated to 80° C. and may be removed from the mold after 1.5 minutes. The resistance to breakage by bending is reached after 1.5 minutes at 80° C. An elastomer having the following mechanical properties is obtained after a tempering time of 24 hours at 80° C.:

| Tensile strength (DIN 53504) | 24.6 MPa |
|---|---|
| Elongation at break (DIN 53504) | 650% |
| Tear propagation resistance (DIN 53515) | 35.4 KN/m |
| Shore Hardness A (DIN 53505) | 79 |
| Elasticity (DIN 53512) | 35% |

EXAMPLE 19

100 parts by weight of the prepolymer of Example 18 are mixed with 14.69 parts by weight of 4,4'-diamino-3,3',5,5'-tetraethyldiphenylmethane (NCO:NH$_2$=1.05) at 60° C. The mixture remains in a pourable state for 0.5 minutes at 60° C. It is poured into a mold preheated to 80° C. and may be removed from the mold after 1.5 minutes at this temperature. The resistance to breakage by bending is reached after 1.5 minutes at 80° C.

An elastomer having the following mechanical properties is obtained after a tempering time of 24 hours at 80° C.:

| Tensile strength (DIN 53504) | 29.5 MPa |
|---|---|
| Elongation at break (DIN 53504) | 635% |
| Tear propagation resistance (DIN 53515) | 30 KN/m |
| Shore Hardness A (DIN 53505) | 72 |
| Elasticity (DIN 53512) | 25% |

EXAMPLE 20

100 parts by weight of a prepolymer having an isocyanate content of 4.41% obtained from the polyether mixture of Example 14 and 44.86 parts by weight of a sulfur-containing diisocyanate of the invention (2,4'-diisocyanato-3'-chlorodiphenylsulfide) are mixed with 13.86 parts by weight of 3,5-diamino-4-methylbenzoic acid-2-ethylhexylester (NCO:NH$_2$=1.05) at 80° C. The mixture remains in a pourable state for 2 minutes at 80° C. It is poured into a mold preheated to 80° C. and may be removed from the mold after 3.5 minutes. The resistance to breakage by bending is reached after 3.5 minutes at 80° C. An elastomer having the following mechanical properties is obtained after a tempering time of 24 hours at 80° C.:

| Tensile strength (DIN 53504) | 24.5 MPa |
|---|---|
| Elongation at break (DIN 53504) | 640% |
| Tear propagation resistance (DIN 53515) | 42 KN/m |
| Shore Hardness A (DIN 53505) | 82 |
| Elasticity (DIN 53512) | 32% |

EXAMPLE 21

100 parts by weight of the prepolymer having an isocyanate content of 4.35% obtained from the polypropylene glycol-polyether mixture of Example 14 and 43.9 parts by weight of a sulfur-containing diisocyanate of the invention (2,4'-diisocyanato-3'-ethyldiphenylsulfide) are mixed with 13.84 parts by weight of 3,5-diamino-4-methylbenzoic acid ethyl ester (NCO:NH$_2$=1.05) at 60° C. The mixture remains in a pourable state for 2 minutes at 60° C. It is poured into a mold preheated to 80° C., and it may be removed from the mold after 2 minutes. An elastomer having the following mechanical properties is obtained after a tempering time of 24 hours at 80° C.:

| Tensile strength (DIN 53504) | 83.8 MPa |
|---|---|
| Elongation at break (DIN 53504) | 730% |
| Tear propagation resistance (DIN 53515) | 39.3 KN/m |
| Shore Hardness A (DIN 53505) | 82 |
| Elasticity (DIN 53512) | 36% |

EXAMPLE 22

(Comparison Example)

100 parts by weight of a prepolymer having an isocyanate content of 2.85% prepared from a polyether polyol mixture consisting of 80 parts by weight of a linear, bifunctional polyether having a molecular weight of 4000 prepared by propoxylation of 1,2-propylene glycol and subsequent addition of ethylene oxide to the propoxylation product, and 20 parts by weight of propoxylated trimethylol propane having a molecular weight of 4800 and 16.25 parts by weight of a liquid diisocyanatodiphenylmethane having an isocyanate content of 33.6% are mixed with 8.83 parts by weight of 3,5-diamino-4-methylbenzoic acid-2-ethylhexylester (NCO:NH$_2$=1.05) at 60° C. The mixture remains in a pourable state for one minute at 60° C. It is poured into a mold which has been preheated to 80° C. and it may be removed from the mold after 10 minutes at this temperature. The resistance to breakage by bending is reached after 24 minutes at this temperature. An elastomer having the following mechanical properties is obtained after a tempering time of 24 hours at 80° C.:

| Tensile strength (DIN 53504) | 10.45 MPa |
|---|---|
| Elongation at break (DIN 53504) | 994% |
| Tear propagation resistance (DIN 53515) | 18.7 KN/m |
| Shore Hardness A (DIN 53505) | 70 |
| Elasticity (DIN 53512) | 45% |

EXAMPLE 23

100 parts by weight of a prepolymer having an isocyanate content of 2.8% prepared from the polyether-polyol mixture of Example 22 and 17.65 parts by weight of a sulfur-containing diisocyanate of the invention (2,4'-diisocyanatodiphenylsulfide) are mixed with 8.82 parts by weight of the diamine from Example 22 (NCO:NH$_2$−1.05) at 60° C. The mixture remains in a pourable state for 1.5 minutes at 60° C. It is poured into a mold preheated to 80° C. and it may be removed from the mold after 10 minutes at this temperature. The resistance to breakage by bending is reached after 16 minutes at this temperature. An elastomer having the following mechanical properties is obtained after a tempering time of 24 hours at 80° C.:

| Tensile strength (DIN 53504) | 9.8 MPa |
|---|---|
| Elongation at break (DIN 53504) | 1128% |
| Tear propagation resistance (DIN 53515) | 22.1 KN/m |
| Shore Hardness A (DIN 53505) | 64 |
| Elasticity (DIN 53512) | 50% |

EXAMPLE 24

100 parts by weight of a prepolymer having an isocyanate content of 3.4% prepared from a linear bifunctional polyester diol of adipic acid and ethylene glycol (molecular weight 2,000) and 30.6 parts by weight of a diisocyanate of the invention (2-(6-isocyanatohexylthio)-phenylisocyanate) are mixed with 13.35 parts by weight of 3,5-diamino-4-chlorobenzoic acid isobutyl ester (NCO:NH$_2$−1.1) at 80° C. The mixture remains in a pourable state for 18 minutes. It is poured into a mold which has been preheated to 110° C. and it may be removed from the mold after 30 minutes. An elastomer having the following mechanical properties is obtained after a tempering time of 24 hours at 110° C.:

| Tensile strength (DIN 53504) | 22.5 MPa |
|---|---|
| Elongation at break (DIN 53504) | 780% |
| Tear propagation resistance (DIN 53515) | 35 KN/m |
| Shore Hardness A (DIN 53505) | 75 |
| Elasticity (DIN 53512) | 38% |

What is claimed is:

1. Diisocyanates corresponding to the general formula:

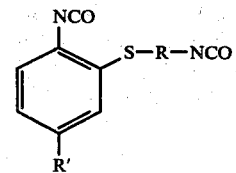

wherein
R represents a saturated aliphatic hydrocarbon group having from 2 to 12 carbon atoms in which at least 2 carbon atoms are situated between the isocyanate group and the sulfur atom, or a paraphenylene group which optionally may have a bromine or chlorine substituent or a substituent selected from the group R″, O—R″, S—R″ or SO$_2$—R″ in at least one ortho-position to the isocyanate group on the paraphenylene group;
R′ represents hydrogen, bromine, chlorine, SO$_2$—R″, OR″ or SR″; and
R″ represents an alkyl group having from 1 to 4 carbon atoms.

2. The diisocyanates as claimed in claim 1, further characterized in that
R represents a saturated aliphatic hydrocarbon group having from 2 to 6 carbon atoms in which at least 2 carbon atoms are situated between the isocyanate group and the sulfur atom or a p-phenylene group which optionally may have a chlorine or C$_1$-C$_4$ alkyl substituent in at least one ortho-position to the isocyanate group on the p-phenylene group; and
R′ represents hydrogen.

3. The diisocyanates as claimed in claim 1, further characterized in that
R represents a paraphenylene group which optionally may have a bromine or chlorine substituent or a substituent selected from the group R″, O—R″, S—R″ or SO$_2$—R″ in at least one ortho-position to the isocyanate group on the paraphenylene group.

4. A process for the preparation of diisocyanates comprising phosgenating diamines corresponding to the general formula:

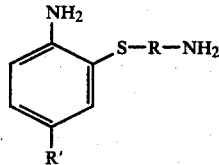

wherein
R represents a saturated aliphatic hydrocarbon group having from 2 to 12 carbon atoms in which at least 2 carbon atoms are situated between the amine group and the sulfur atom, or a paraphenylene group which optionally may have a bromine or chlorine substituent or a substituent selected from the group R″, —O—R″, —S—R″ or SO$_2$—R″ in at least one of the ortho-positions to the amine group on the paraphenylene group;
R′ represents hydrogen, bromine, chlorine, SO$_2$—R″, OR″ or SR″; and R" represents an alkyl group having from 1 to 4 carbon atoms.
5. The process as claimed in claim 4, wherein said diamines are further characterized in that R represents a saturated aliphatic hydrocarbon group having from 2 to 6 carbon atoms in which at least 2 carbon atoms are situated between the amine group and the sulfur atom or a p-phenylene group which optionally may have a chlorine or $C_1$–$C_4$ alkyl substituent in at least one ortho-position to the amine group on the p-phenylene group; and R' represents hydrogen.

* * * * *